Patented May 22, 1945

2,376,338

UNITED STATES PATENT OFFICE 2,376,338

POLYMERIZATION OF BUTADIENE-1,3 HYDROCARBONS

George L. Browning, Jr., Akron, Ohio, assignor, by mesne assignments, to The B. F. Goodrich Company, Akron, Ohio, a corporation of New York No Drawing. Application September 22, 1941, Serial No. 411,847

8 Claims. (Cl. 260—84.5).

This invention relates to the polymerization of butadiene-1,3 hydrocarbons, and particularly to a method whereby butadiene-1,3 hydrocarbons may be polymerized in the form of aqueous emulsions to form products closely resembling natural crude rubber.

The emulsion polymerization of butadiene-1,3 hydrocarbons either alone or in admixture with other monomers copolymerizable therewith to form compositions of matter more or less resembling rubber is well known. It has been commonly observed, however, that the products of such polymerization reactions often resemble vulcanized rubber rather than natural crude rubber in respect to solubility, plasticity, and processing characteristics. Thus it has often been found that the polymers were insoluble in, and, in some cases, not even swelled by benzene or acetone, and that they were tough, non-plastic materials which either would not homogenize on a mill or which were very difficult to mill and to subject to other ordinary processing operations.

I have now discovered a class of materials which modifies the emulsion polymerization of butadiene-1,3 hydrocarbons in such a manner that polymers more nearly resembling natural crude rubber may be produced than when the polymerization is effected in the absence of the materials of this invention. The class of materials, which I have termed "modifiers," consists of compounds represented by the structural formula

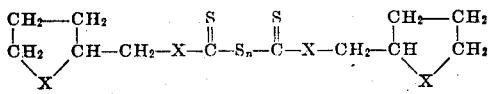

wherein X represents oxygen or sulfur and $n$ is an integer. It will be seen that these compounds are xanthogeno sulfides derived from tetrahydrofurfuryl alcohol or thiol and the corresponding derivatives of thiotetrahydrofurfuryl alcohol. As examples of these compounds may be mentioned bis(tetrahydrofurfuryloxythiono) monosulfide, bis(tetrahydrofurfuryloxythiono) disulfide, bis(tetrahydrofurfuryloxythiono) trisulfide, bis(tetrahydrofurfuryloxythiono) tetrasulfide, bis((thiotetrahydrofurfuryloxythiono) disulfide, bis(tetrahydrofurfurylthiothiono) disulfide, and bis(thiotetrahydrofurfurylthiothiono) disulfide. Polysulfides of undetermined structure which contain a higher proportion of sulfur than the tetrasulfides may also be employed.

The effect of the modifiers of this invention on emulsion polymerization is shown by the copolymerization at 30° C. of 55 parts by weight of butadiene and 45 parts of acrylonitrile in the presence of about 250 parts of a 2% aqueous solution of myristic acid which had been 85% neutralized with sodium hydroxide, 0.35 part of hydrogen peroxide as an initiator, 0.11 part of sodium ferri pyrophosphate as an activator, and 0.6 part of bis(tetrahydrofurfuryloxythiono) disulfide. The polymer obtained by coagulating the latex formed was in a plastic and coherent form, while the polymer obtained by polymerization in the absence of any modifier was in the form of non-plastic, non-coherent crumbs. The vulcanizate prepared by testing the modifier in a tire tread recipe was unusually strong and exhibited a high elongation. It was also observed that the bis(tetrahydrofurfuryloxythiono) sulfides were more effective, particularly in producing polymers forming strong vulcanizates, than the bis(alkoxythiono) sulfides. Thus .8 part of bis-(tetrahydrofurfuryloxythiono) disulfide and 0.6 part of bis(isopropyloxythiono) disulfide both contain about 0.14 part of sulfur in the disulfide linkage, yet the use of .8 part of the tetrahydrofurfuryl compound produces polymers forming stronger vulcanizates than the polymers prepared in the presence of 0.6 part of the diisopropyl compound. The use of .4 part of bis-(tetrahydrofurfuryl oxythiono) disulfide, which contains only about 0.07 part of sulfur in the disulfide linkage, produces polymers forming vulcanizates as strong as polymers prepared in the presence of 0.6 part of bis(isopropyl oxythiono) disulfide which contains twice as much sulfur in the disulfide linkage. These results are unexpected since the sulfide linkage is believed to be the active part of the molecule insofar as modifying activity is concerned.

The proportion in which the modifier is included in the composition depends somewhat upon the properties desired in the product, the higher proportions of modifier in general producing softer, more soluble polymers. Very small amounts of modifier such as 0.1% or even less based on the monomers in the emulsion may profoundly affect the nature of the polymer produced, and amounts up to 5% or more may advantageously be employed. It may also be advantageous to employ a mixture of one of the modifiers herein claimed with other known types of modifiers such as tetraalkyl thiuram polysulfides, mercaptoalkylthiazoles or other types of compounds known to exhibit modifying activity in emulsion polymerization processes.

The modifying agents of this invention may be employed in the polymerization in the form of an aqueous emulsion of butadiene-1,3 hydrocarbons, by which is meant butadiene-1,3 (commonly termed butadiene) and its homologues which enter into polymerization reactions in essentially the same manner, either alone or in admixture with each other and/or other monomers copolymerizable therewith such as styrene, isobutylene, acrylonitrile, methyl methacrylate, methyl acrylate, methyl vinyl ether, methyl vinyl ketone, and other unsaturated hydrocarbons, esters, ethers, and ketones. For the production of rubbery products, these other monomers should be employed in an amount smaller than the butadiene.

The polymerization of the above materials in aqueous emulsion may be effected by various initiators of polymerization such as per-compounds including per-acids, peroxides and per-salts such as persulfates, perborates, percarbonates, and the like as well as other types of initiators such as diazoaminobenzene, hydrosulfites, bisulfites, and dipotassium diazomethane disulfonate.

The polymerization reactions may be catalyzed in any desired manner, the use of heavy metal catalysts being particularly desirable. The heavy metal catalyst may be added to the emulsion in the form of less than 0.1% based on the weight of the monomers of a simple ionizable heavy metal salt such as cobalt chloride, nickelous sulfate, mercuric chloride, etc., as disclosed in the copending application of William D. Stewart, Serial No. 739,712 filed February 14, 1941, or in the form of a redox system comprising a heavy metal and a material such as sodium pyrophosphate, levulinic acid, glycine, cystine, beta-mercaptoethanol, quebrachitol, ox-bile or cholesterol as disclosed in the copending applications of William D. Stewart, Serial Nos. 379,713 to 379,717 filed February 14, 1941.

Any of the ordinary emulsifying agents such as fatty acid soaps including sodium oleate, potassium stearate, sodium myristate, etc., may be employed, as well as synthetic saponaceous materials such as hymolal sulfates and alkaryl sulfonates including sodium lauryl sulfate and sodium isopropyl naphthalene sulfonate.

The term "sulfide" as herein used specifies both the mono- and polysulfides, unless it is specifically limited by a prefix such as mono- or di-.

Although I have herein disclosed specific embodiments of my invention, I do not intend to limit the invention solely thereto, for it will be obvious to those skilled in the art that many variations and modifications are within the spirit and scope of the invention as defined in the appended claims.

I claim:

1. The method which comprises polymerizing a butadiene-1,3 hydrocarbon in the form of an aqueous emulsion in the presence of a small amount of a compound represented by the structural formula

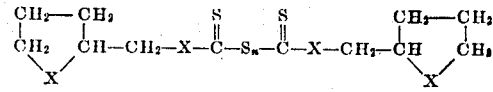

wherein X is a number of the group consisting of oxygen and sulfur and $n$ is an integer.

2. The method which comprises polymerizing a butadiene-1,3 hydrocarbon in the form of an aqueous emulsion in the presence of a bis(tetrahydrofurfuryl-oxythiono) sulfide.

3. The method which comprises polymerizing a butadiene-1,3 hydrocarbon in the form of an aqueous emulsion in the presence of bis(tetrahydrofurfuryl-oxythiono) disulfide.

4. The method which comprises polymerizing in the form of an aqueous emulsion a mixture of butadiene and a smaller amount of a monomer copolymerizable therewith in aqueous emulsion, in the presence of a small amount of a compound represented by the structural formula

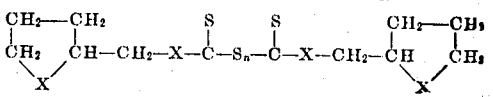

wherein X is a member of the group consisting of oxygen and sulfur and $n$ is an integer.

5. The method which comprises polymerizing in the form of an aqueous emulsion a mixture of butadiene and a smaller amount of a monomer copolymerizable therewith in aqueous emulsion, in the presence of a bis(tetrahydrofurfuryl oxythiono) sulfide.

6. The method which comprises polymerizing in the form of an aqueous emulsion a mixture of butadiene and a smaller amount of a monomer copolymerizable therewith in aqueous emulsion, in the presence of bis(tetrahydrofurfuryl oxythiono) disulfide.

7. The method which comprises polymerizing in the form of an aqueous emulsion a mixture of butadiene and a smaller amount of acrylonitrile in the presence of bis(tetrahydrofurfuryl oxythiono) disulfide.

8. The method which comprises polymerizing in the form of an aqueous emulsion a mixture of butadiene and a smaller amount of styrene in the presence of bis(tetrahydrofurfuryl oxythiono) disulfide.

GEORGE L. BROWNING, JR.

Certificate of Correction

Patent No. 2,376,338. May 22, 1945.

GEORGE L. BROWNING, Jr.

It is hereby certified that errors appear in the printed specification of the above numbered patent requiring correction as follows: Page 2, first column, line 32, for the Serial Number "739,712" read *379,712*; and second column, lines 27 to 30, for that portion of the formula reading and that the said Letters Patent should be read with these corrections therein that the same may conform to the record of the case in the Patent Office.

Signed and sealed this 23d day of October, A. D. 1945.

[SEAL]

LESLIE FRAZER,
*First Assistant Commissioner of Patents.*